Jan. 29, 1952 H. HELD ET AL 2,583,696
CYCLONE DUST COLLECTOR
Filed July 23, 1948
Fig.1.
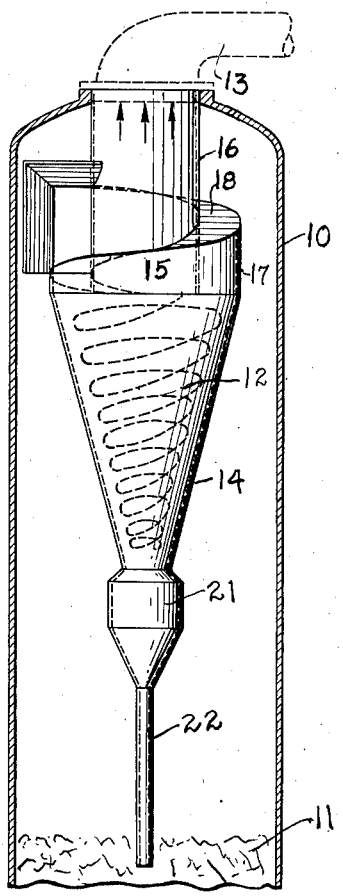
Fig.2.
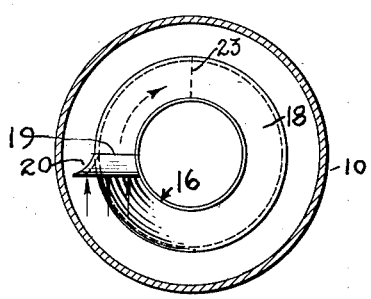
Fig.3.
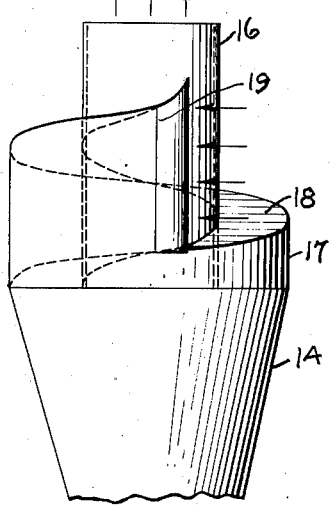
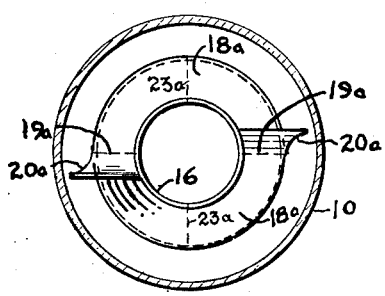
Fig.4.
INVENTORS
JOHN WEITS
BY HANS HELD
ATTORNEY Patented Jan. 29, 1952

2,583,696

UNITED STATES PATENT OFFICE 2,583,696

CYCLONE DUST COLLECTOR

Hans Held, Flushing, and John Weits, Baldwin, N. Y.

Application July 23, 1948, Serial No. 40,234

3 Claims. (Cl. 183—83)

This invention relates to a centrifugal separator of the type known in the art as a cyclone, and more particularly to the combination of such a device with an enclosing structure, such for example as is required in the cracking of oil.

In our copending application Serial No. 10,014, now abandoned, we have disclosed a dust collector of the general type referred to, but the construction of that application is adapted to the purification of gases and vapors, and difficulties and inefficiency occur when the construction there disclosed is utilized within an outer enclosure as is required for use in the cracking of oil. The word gas will be used herein to include air, vapors and gases.

It is an object of this invention to provide an apparatus comprising in combination an outer chamber in which the gases to be treated may be contained, and a centrifugal separator within said chamber, the whole being so arranged and the parts being so associated that the material may be moved through the chamber and through the separator with the maximum of efficiency.

It is a further object to provide such a device in which the total volume of the enclosing chamber may be a minimum compared to the size of the cyclone units; that is, in which the space within the chamber may be utilized to the maximum advantage.

The enclosure of a dust collector such as is shown in our copending application introduces serious limitations both in space and efficiency. The limitations of efficiency arise from the fact that such separators have intake conduits arranged tangentially and extending outwardly from the body. When such a separator is enclosed within the outer chamber, serious eddy currents are introduced at the entrance which are carried into the chamber. These materially interfere with the incoming current of air because of the rapid change of direction of the air as it comes from other parts of the outer chamber to enter the separator intake. This limitation will seem to be serious when it is recalled that the velocity of the entering air is 4000 feet a minute.

Moreover, it has been found that where such a separator is enclosed within a chamber, the chamber wall must be spaced away from the intake a substantial distance to reduce the choking effect between the chamber wall and the edge of the intake, and even so, the gas at that point must rapidly acquire a change in direction and a high velocity, whereas the gas within the chamber is relatively quiescent.

In accordance with this invention, it has been found that these difficulties may be eliminated if, instead of employing a tangentially extending intake to the separator which receives its gas tangentially, we admit the gas spirally. To accomplish this result, we place the plane of the entrance of the intake to the separator radially. This permits the gas to circulate around the exit conduit before entering the intake, thus eliminating eddy currents at the intake to a very large degree. With such a construction there is a tendency for all the gas within the outer chamber to acquire a circular movement so that there is no point at which there is a sudden change of velocity or direction, thus permitting gradual acceleration of the gas up to the inlet. This effect is still more noticeable if the separator be placed coaxially with the outer chamber so as to permit all the gas within the outer chamber to take part in this circular movement without being throttled at any point.

Under practical conditions the older form of cyclone when used within a chamber must be placed off center of the chamber so as to accommodate a protruding inlet without making the chamber of undue size. This makes the space on one side of the separator much smaller than on the other, interfering with the smooth circulation of gas around the separator.

This invention accordingly comprises an apparatus possessing the features, properties and the relation of elements which will be exemplified in the apparatus hereinafter described and the scope of the application of which will be indicated in the claims.

For a fuller understanding of the nature and objects of the invention, reference should be had to the following detailed description taken in connection with the accompanying drawings, in which:

Fig. 1 is a front elevation of a device embodying this invention, the outer chamber being shown in section. Fig. 2 is a section on the line 2—2 of Fig. 1. Fig. 3 is a fragmentary side elevation of the upper portion of the device as seen from the left hand side of Fig. 1. Fig. 4 is a view similar to Fig. 2 of a modification.

This device is primarily employed in the cracking of oil. It comprises primarily a chamber 10 having in its lower portion a bed of catalyst 11, such as is commonly employed in the cracking of oil. In the upper portion of the chamber and extending downwardly therein is a separator 12. As shown, the chamber 10 is cylindrical and the separator 12 is concentric with it. The numeral 13 represents an outlet from which the gaseous products of the reaction are discharged. The separator 12 comprises primarily a conical chamber 14 having its upper end attached to a spiral intake portion 15 which completely encircles an axially disposed discharge 16 which connects with the outlet 13. This intake portion is here shown as bounded on the inside by the discharge 16 and on the outside by a cylindrical wall 17 joined to the top of the cone. The top face of this intake 18 is helical, so that the gas entering the intake in its revolution around the discharge pipe is carried smoothly downwardly and is discharged circumferentially into the cone just below the gas entering the intake. The entrance 19 to this intake portion is substantially in a radial plane, as will be seen from Figs. 2 and 3, but it carries at its outer end a flared member 20 to facilitate the entrance of gas into the intake without eddy currents. This becomes more and more important as the radial depth of the passage between the casing 10 and the intake 15 decreases, and when the radial depth of this passage is, as shown in the drawings commensurate with the radial depth of the intake of the cyclone, it is possible for the gases to enter the cyclone concentrically with no sudden change in velocity or direction at the intake of the cyclone. At the lower end of the conical chamber 14 is provided a dust trap 21 containing suitable means for preventing the dust from returning from the trap into the conical chamber. Such means are well-known in the art and are disclosed in our copending application above referred to and need not be disclosed here. The lower end of the dust trap 21 terminates in a tube 22 which is carried below the level of the catalyst in the bottom of the chamber, so that all the catalyst dust collected in the cone is returned to the catalyst bed.

In operation, the material to be cracked is fed upwardly into the chamber 10 through the bed of catalyst 11 at suitable temperatures as is well-known in the art. As it passes through the bed it carries with it some of the finer particles of the catalyst together with other impurities which may be therein and rises on the outside of the cone 14 to the entrance 19 of the intake. During this rising the gas gradually takes upon itself a circular motion, so that it is ready to enter the intake with a minimum of disturbance. The gas as it passes into the separator at high speed acquires a high circular velocity, and by reason of the fact that it is carried downwardly by the helical tube 18 of the intake, it commences a relatively smooth and uninterrupted vortex within the cone which throws the dust including the particles of the catalyst against the cone wall, down which they slide into the dust collector. As the spiral passes downwardly, however, it becomes more and more constricted by the decreasing diameter of the cone and there results an inner spiral composed of the purified gas, which inner spiral passes upwardly through the discharge 16 into the outlet 13.

It is preferable that the helical top face 18 be continued for about 1¼ turns, the lowermost edge being shown at 23 so that for about ¼ turn it furnishes the bottom wall of the intake duct. In this manner both the incoming gas and the gas that has been circulated one turn are brought into a substantially parallel stream before they meet.

From this description it will be seen that by reason of the arrangement of the intake, it is possible to utilize a cylindrical outer chamber concentric with the separator, resulting in a minimum of disturbance to the gas as it rises to the separator intake. Moreover, it will be seen that whether the chamber 10 is circular or not and whether it contains one or more of the separators, nevertheless such separators can be placed more advantageously within the outer chamber by reason of the arrangement of the intake, and a substantial circular movement of gas around the discharge pipe will occur adjacent to the intake, even though several separators are placed within a single outer chamber. It follows that the advantages of the freedom from eddy currents at the intake are obtained in such a situation also.

This device may also be constructed with a plurality of symmetrically arranged openings 19a, each symmetrically arranged around the circumference, each opening being substantially in a radial plane. These openings are each provided with a flared flange 20a and both openings are at the same horizontal level. The top face 18a of each of these openings is carried around the discharge 16a as in the first modification. In this modification, the helical top of one opening is carried substantially ¾ of a full turn down below the opposite opening, thus becoming for about ¼ turn the bottom wall of the opposite intake.

In general, where two such openings are employed it is preferable that they be of a combined size commensurate with the size in the modification with the single opening, since in this device it is important that the velocity of the gas entering the cyclone shall be kept high in order to maintain the centrifugal effect.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

We claim:

1. An apparatus for treating material, comprising a cylindrical chamber through which gaseous matter to be treated is passed upwardly, a cyclone type collector concentrically mounted in the upper portion of said chamber having its outer walls at the intake end spaced from the walls of said chamber to form between them a circular passage having a radial depth commensurate with the radial depth of the intake of the cyclone, said cyclone having its intake duct wholly concentric, and the outlet duct of said cyclone passing out through the top wall of said chamber.

2. An apparatus for treating material, comprising a cylindrical chamber through which gaseous matter to be treated is passed upwardly, a cyclone type collector concentrically mounted in the upper portion of said chamber having its outer walls at the intake end spaced from the walls of said chamber to form between them a circular passage, said cyclone having its intake duct wholly concentric and a mouth in a radial plane, and the outlet duct of said cyclone passing out through the top wall of said chamber.

3. An apparatus for treating material, comprising a cylindrical chamber through which gaseous matter to be treated is passed upwardly, a cyclone type collector concentrically mounted in the upper portion of said chamber having its outer walls at the intake end spaced from the walls of said chamber to form between them a circular passage, said cyclone having its intake duct wholly concentric and a mouth in a radial plane and having an inclined baffle extending from said mouth toward the wall of said chamber, and the outlet duct of said cyclone passing out through the top wall of said chamber.

HANS HELD.
JOHN WEITS.

REFERENCES CITED

The following references are of record in the file of this patent:

UNITED STATES PATENTS

| Number | Name | Date |
|---|---|---|
| 408,987 | Morse | Aug. 13, 1889 |
| 1,342,152 | Bennett | June 1, 1920 |
| 2,214,658 | Browning | Sept. 10, 1940 |
| 2,300,129 | McCurdy | Oct. 27, 1942 |
| 2,437,352 | Fragen | Mar. 9, 1948 |